F. Grosjean.
Spoon.
No. 2,682. Reissued July 16, 1867.
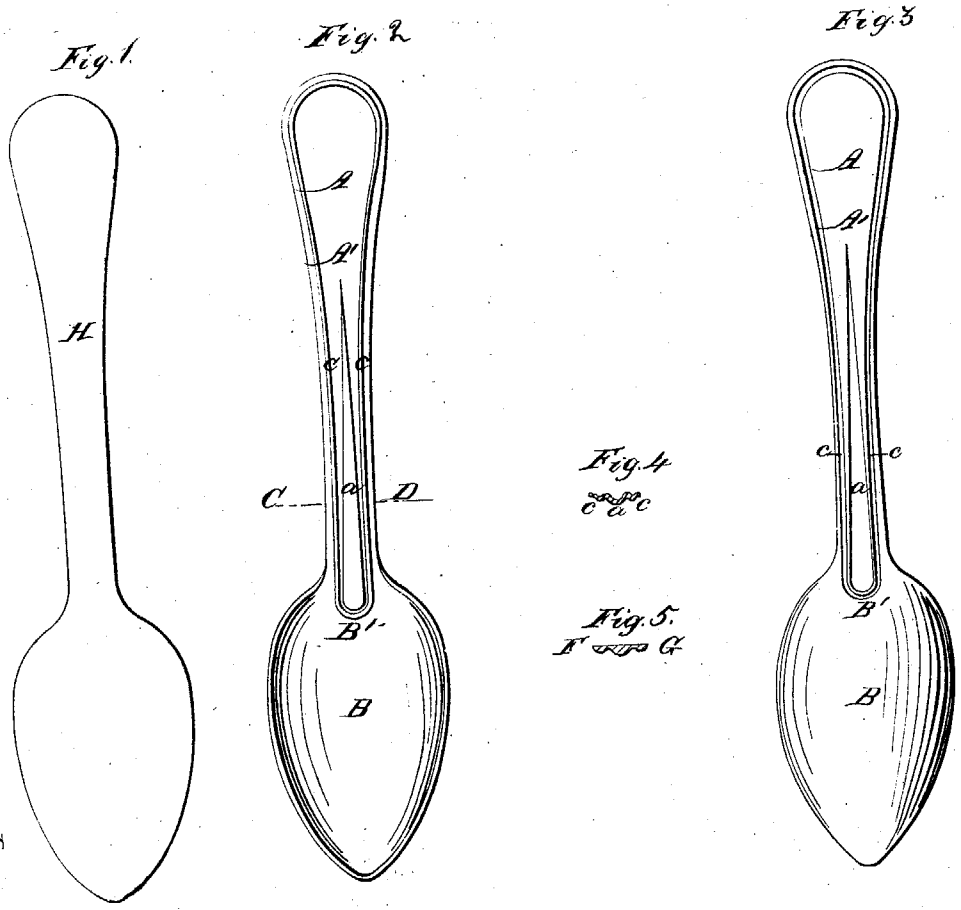
Witnesses.
W. L. Bennem
R. J. Cunningham
Inventor
F. Grosjean
by his attorney
E. S. Renwick
N. PETERS, PHOTO-LITHOGRAPHER, WASHINGTON, D. C.

UNITED STATES PATENT OFFICE.

FLORIAN GROSJEAN, OF NEW YORK, N. Y.

IMPROVEMENT IN SPOONS AND FORKS.

Specification forming part of Letters Patent No. 34,252, dated January 28, 1862; Reissue No. 1,509, dated July 7, 1863; Reissue No. 1,727, dated July 12, 1864; Reissue No. 2,682, dated July 16, 1867.

*To all whom it may concern:*

Be it known that I, FLORIAN GROSJEAN, of New York, in the county and State of New York, have invented a new and Improved Spoon made of Sheet Metal; and I do hereby declare that the following is a full and exact description thereof, reference being had to the accompanying drawings, and to the letters of reference marked thereon.

The object of my invention is to produce from sheet metal spoons and similar articles with handles which have not only the requisite stiffness for practical use, but are at the same time of good shape and finish, so that they resemble in rigidity and appearance the solid thick handles which are usually found upon silver and plated table-ware.

To this end my invention consists of a sheet-metal handle having one or more of the following characteristic peculiarities, viz: First, a central corrugation or hollow ridge extending along the central part of the narrow portion of the handle, and vanishing or ending in the central part of the broad portion or palm of the handle by tapering sidewise and flatwise, in contradistinction to spreading sidewise to the rim of the said palm; second, a central corrugation or hollow ridge extending along the central part of the narrow portion of the handle, and vanishing or ending in the central part of the bowl (or the substitute thereof) by tapering sidewise and flatwise, in contradistinction to spreading sidewise to the rim of the said bowl or its substitute; third, two lateral corrugations or hollow beads extending into the palm of the handle, and along the narrow part of the handle, with a space between them, which may be occupied by one or the other of the central hollow ridges above described, or by a central hollow ridge having the terminal peculiarities of both those above described.

In the accompanying drawings, Figures 2 and 3 represent a spoon with a handle having all the aforesaid characteristic features combined.

H, Fig. 1, represents the blank piece of sheet metal of which the spoon is shaped. It is formed, by swaging it in suitable dies, into the shape substantially shown in the two Figs., 2 and 3, representing, respectively, a front and back view of the finished spoon.

The bowl B is of ordinary shape, and the narrow part of the handle, say, from A′ to B′, has a central corrugation or hollow ridge, *a*, as indicated more clearly in the cross-section, Fig. 4, which gradually vanishes into the central part of the broad portion or palm A of the handle by tapering sidewise and flatwise. It also vanishes into the central part of the bowl B in the same manner. On each side of this central corrugation, near the edges of the handle, are formed two other smaller corrugations or hollow beads, *c c*, as indicated clearly in the same cross-section, and by lines in Figs. 2 and 3. These hollow beads, for good appearance, may continue around the whole edge of the spoon-handle, and be united as represented, and they should extend far enough down into the bowl (where they should also be united) to insure the requisite strength where the handle and bowl unite.

This addition of the beads is advantageous, as it greatly increases the strength at the bowl. The outer hollow beads also give a better and handsomer form to the whole spoon.

The improvement is obviously applicable to forks formed out of sheet metal, as well as to spoons. It enables spoons and forks of durability and good shape to be made in the cheapest manner known.

I do not claim mere beads or ornaments formed on the surface of spoon and fork handles made of rolled or cast metal, such, for instance, as the solid beads indicated in the cross-section, F G, Fig. 5; nor do I claim, broadly, a corrugated or swaged handle for a spoon or similar article; but

What I claim as my invention, and desire to secure by Letters Patent, is—

1. A sheet-metal handle having a central corrugation or hollow ridge which extends along the narrow part of the said handle, and vanishes into the broad portion or palm thereof by tapering sidewise and flatwise, substantially as before set forth.

2. A sheet-metal handle having a central corrugation or hollow ridge which extends along the narrow part of the handle, and vanishes into the bowl (or its substitute) by tapering sidewise and flatwise, substantially as before set forth.

3. A sheet-metal handle having two lateral hollow beads or corrugations which extend, with a space between them, longitudinally along the narrow part of the handle into the palm thereof, substantially as before set forth.

4. A sheet-metal handle having the central hollow ridge combined with the lateral hollow beads, substantially as before set forth.

In testimony whereof I have hereunto set my hand.

F. GROSJEAN.

Witnesses:
AUG. WYSARD,
JULIEN P. CORDIER.